US010528812B1

(12) United States Patent
Brouard et al.

(10) Patent No.: US 10,528,812 B1
(45) Date of Patent: Jan. 7, 2020

(54) DISTRIBUTED AND SELF-VALIDATING COMPUTER VISION FOR DENSE OBJECT DETECTION IN DIGITAL IMAGES

(71) Applicant: Accenture Global Solutions Limited, Dublin (IE)

(72) Inventors: Gilles Brouard, Paris (FR); Lewen Zhao, Paris (FR); Natacha Fort, Manly (AU); Ke Zeng, Pantin (FR); Adrien Jacquot, Antibes (FR); Vitalie Schiopu, Bertrange (LU); Florin Cremenescu, Biot (FR)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 16/502,454

(22) Filed: Jul. 3, 2019

(30) Foreign Application Priority Data

Jan. 29, 2019 (EP) ..................................... 19305110

(51) Int. Cl.
*G06K 9/00* (2006.01)
*G06K 9/62* (2006.01)
(Continued)

(52) U.S. Cl.
CPC ..... *G06K 9/00637* (2013.01); *G06K 9/00651* (2013.01); *G06K 9/4642* (2013.01);
(Continued)

(58) Field of Classification Search
CPC ........... G06K 9/00637; G06K 9/00651; G06K 9/4642; G06K 9/6256; G06T 7/11; G06N 3/04
See application file for complete search history.

(56) References Cited

U.S. PATENT DOCUMENTS 8,774,470 B1 * 7/2014 Schmidt ............... G06K 9/0063
382/113
2017/0287170 A1 10/2017 Perona et al.
(Continued)

FOREIGN PATENT DOCUMENTS

EP          3065085 A1     9/2016
WO    WO 2017/040691 A1   3/2017
WO    WO 2017/131629 A1   8/2017

OTHER PUBLICATIONS

Extended European Search Report in Europe Application No. 19305110.9, dated Jul. 25, 2019, 15 pages.

*Primary Examiner* — Ping Y Hsieh
(74) *Attorney, Agent, or Firm* — Brinks Gilson & Lione

(57) ABSTRACT

A system for object recognition and segmentation from digital images provides an intelligent object recognition and segmentation using one or more multilayer convolutional neural network (CNN) models trained in multiple-stages and in a parallel and distributed manner to improve training speed and efficiency. The training dataset used in each of the multiple training stages for the CNN models are generated, expanded, self-validated from a preceding stage. The trained final CNN models are augmented with post-model filters to enhance prediction accuracy by removing false positive object recognition and segmentation. The system provides improved accuracy to predict object labels to append to unlabeled image blocks in digital images. In one embodiment, the system may be useful for enhancing a digital landmark registry by appending identifying labels on new infrastructure improvements recognized in aerial or satellite land images.

20 Claims, 9 Drawing Sheets

(51) Int. Cl.
*G06T 7/11* (2017.01)
*G06N 3/04* (2006.01)
*G06K 9/46* (2006.01)

(52) U.S. Cl.
CPC ............ *G06K 9/6256* (2013.01); *G06N 3/04* (2013.01); *G06T 7/11* (2017.01)

(56) References Cited

U.S. PATENT DOCUMENTS

2018/0130355 A1* 5/2018 Zia ...................... G06F 17/5009
2019/0034734 A1* 1/2019 Yen ......................... G06T 7/277
2019/0205638 A1* 7/2019 Zhang ................ G06K 9/00463

* cited by examiner

DISTRIBUTED AND SELF-VALIDATING COMPUTER VISION FOR DENSE OBJECT DETECTION IN DIGITAL IMAGES

TECHNICAL FIELD

This disclosure relates to image segmentation and object recognition based on computer vision and artificial intelligence.

BACKGROUND

Object recognition and segmentation in digital images are critical technological components in applications involving computer vision, such as in automated manufacturing assembly line and for autonomous driving. Such object recognition and segmentation may be achieved based on deep learning models trained using, e.g., convolutional neural networks. For different types of digital images and for recognition and segmentation of different types of objects having different densities, a specific training dataset may need to be constructed and the corresponding training process may need to be further engineered for improving training and deployment efficiency, and model accuracy.

SUMMARY

This disclosure is directed to a system and method for intelligent object recognition and segmentation in digital images using one or more multilayer convolutional neural network (CNN) models trained in multiple stages and in a parallel and distributed manner to improve training speed and efficiency. The training dataset used in the multiple training stages for the CNN models are generated, expanded, and self-validated from a preceding stage. The trained final CNN models are augmented with post-model filters to enhance prediction accuracy by removing false positive object recognition and segmentation. The system and method provide improved accuracy to predict object labels to append to unlabeled image blocks in digital images. The system may be useful for enhancing, e.g., a digital landmark registry, by appending identifying labels on new infrastructure improvements recognized in aerial or satellite land images.

In one implementation, a system is disclosed for generating training data and for training a multilayer CNN model in multiple training stages using parallel computing and with an iteratively enhanced and self-validated training data set. The system includes a database, a memory for storing a multilayer landmark recognition and segmentation convolutional neural network, and a system circuitry in communication with the database and the memory. The system circuitry is first configured to receive, from the database, aerial images and land maps corresponding to a geographic region, divide the aerial images into a plurality of partially overlapping aerial blocks and divide the land maps into a plurality of partially overlapping map blocks corresponding to the aerial blocks. The system circuitry is further configured to generate an initial training dataset from the received aerial images and land maps. In particular, the system circuitry may be configured to identify a first set of landmarks each belonging to one of a predetermined set of landmark types in the aerial blocks and store corresponding boundary boxes, locations in the aerial blocks, and landmark types for the first set of landmarks as a first set of training labels. The system circuitry may then be configured to perform an initial training process to generate an intermediate model and an expanded set of training labels for further training. In particular, the system circuitry may be configured to train an intermediate multilayer convolutional neural network using the first set of training labels based on, e.g., gradient descent. The intermediate multilayer convolutional neural network may then be used to process the aerial blocks to output a second set of predicted labels containing boundary boxes, locations, and landmark types of landmarks. The system circuitry is then configured to generate a third set of predicted and validated labels among the second set of predicted labels that are additional to the first set of training labels and combine the third set of predicted and validated labels and the first set of training labels to form an expanded fourth set of training labels. Finally, the system circuitry is further configured to train, in another training stage, to generate the multilayer landmark recognition and segmentation convolutional neural network. In particular, the system circuitry may be configured to iteratively train the multilayer landmark recognition and segmentation convolutional neural network using the aerial blocks and the expanded fourth set of training labels and based on gradient descent. The trained multilayer landmark recognition and segmentation convolutional neural network may then be used to process unlabeled input aerial images and to obtain predicted landmark labels for the unlabeled aerial blocks.

In the implementation above, the landmarks may include buildings and swimming pools and the predetermined set of landmark types correspondingly include a building type and a swimming pool type. The system circuitry may further be configured to perform post-model filtering. For example, the predicted landmark labels for the unlabeled aerial blocks may be filtered by identifying roads in the unlabeled aerial blocks according to map blocks corresponding to the unlabeled aerial blocks, identifying predicted landmark labels for the unlabeled aerial blocks that are of the swimming pool type and that overlap with the roads as erroneous labels, and removing the erroneous labels from the predicted landmark labels for the unlabeled aerial blocks for generated a corrected set of predicted landmark labels. For another example, the system circuitry may be further configured to filter the predicted landmark labels for the unlabeled aerial blocks by identifying predicted landmark labels for the unlabeled aerial blocks that are of the swimming pool type and that overlap with buildings according to the map blocks corresponding to the unlabeled aerial blocks as erroneous labels, and removing the erroneous labels from the predicted landmark labels for the unlabeled aerial blocks for generated a corrected set of predicted landmark labels.

In the implementations above, the system circuitry may be configured to determine that a predicted landmark of the swimming pool type overlaps with a building when a percentage of a predicted boundary box of the predicted landmark of the swimming pool type that lie within a boundary box of the building is higher than a predetermined percentage threshold.

In the implementations above, the post-model filtering may be performed by identifying predicted landmark labels for the unlabeled aerial blocks that are of the swimming pool type as predicted swimming pools, identifying swimming pools among the predicted swimming pools that overlap, combining the overlapping swimming pools as a single swimming pool to obtain a regenerate label for the single swimming pool, and replacing labels corresponding to the overlapping swimming pools with the regenerated label in the predicted landmark labels for the unlabeled aerial blocks to generate a corrected set of predicted landmark labels.

In the implementations above, the post-model filtering of the predicted landmark labels may be performed in a distributed manner wherein predicted landmark labels are filtered separately and in parallel between aerial blocks.

In the implementations above, the system circuitry may be further configured remove duplicate labels in overlapping regions between aerial blocks. In particular, the system circuitry may be configured to detect duplicate labels among the predicted landmark labels for the unlabeled aerial blocks in regions of partial overlapping among the unlabeled aerial blocks; and remove the duplicate labels from the predicted landmark labels for the unlabeled aerial blocks to generate a de-duplicated predicted labels for the unlabeled aerial blocks.

In the implementations above, the output from the multilayer convolutional neural network may be used to enhance a digital landmark registry. For example, the system circuitry may be further configured to convert locations in the predicted labels to geographical coordinates based on the unlabeled aerial blocks and meta data associated with the unlabeled aerial blocks, to determine a subset of labels among the de-duplicated predicted labels that correspond to entries in a digital landmark registry database based on the geographical coordinates; and to determine tax non-conformity based on boundary box information of the de-duplicated predicted labels and size information contained in the digital landmark registry database. For another example, the system circuitry may be further configured to convert locations in the de-duplicated predicted labels to geographical coordinates based on the unlabeled aerial blocks and meta data associated with the unlabeled aerial blocks, to determine a subset of labels among the de-duplicated predicted labels that do not correspond to any entries in a digital landmark registry database based on the geographical coordinates, and to update the digital landmark registry database with the subset of labels.

In another implementation, a system is disclosed for using a multilayer convolutional neural network such as the ones discussed above for recognizing landmarks in aerial images with improved accuracy and for enhancing a digital landmark registry. The system may include a database, a memory for storing the multilayer landmark recognition and segmentation convolutional neural network, and system circuitry in communication with the database and the memory. The multilayer landmark recognition and segmentation convolutional neural network may be trained using the multistage training procedure discussed above. The system circuitry may be configured to first receive an input aerial image and an input land map corresponding to a geographic region from the database, divide the input aerial image into a plurality of partially overlapping aerial blocks and divide the input land map into a plurality of partially overlapping map blocks corresponding to the aerial blocks. The system circuitry may be further configured to input the aerial blocks with overlapping regions into the multilayer landmark recognition and segmentation convolutional neural network to obtain a first set of predicted landmark boundary boxes for landmarks in the aerial blocks with corresponding landmark labels, wherein each landmark is of one of a predetermined set of landmark types and each boundary box is labeled with one of the predetermined set of landmark types. The system circuitry is configured to then identify and remove duplicate boundary boxes within the overlapping regions between the aerial blocks to generate a second set of predicted landmark boundary boxes and corresponding landmark labels. The system circuitry may be further configured to perform post-model filtering of the boundary boxes. For example, the system circuitry may be configured to apply a first filter to the second set of predicted landmark boundary boxes to remove boundary boxes that are erroneously generated by the multilayer landmark recognition and segmentation convolutional neural network, and to generate a third set of predicted landmark boundary boxes with corresponding landmark labels. Additionally or alternatively, the system circuitry apply a second filter to the third set of predicted landmark boundary boxes to generate a fourth set of predicted landmark boundary boxes with corresponding landmark labels by identifying sets of landmark boundary boxes that are adjacent to each other and are associated with a same landmark within each set of landmark boundary boxes, and by aggregating each set of landmark boundary boxes into a single landmark boundary box. Following the post-model filtering, the system circuitry may be further configured to enhance a digital landmark registry associated with the geographic region. For example, the system circuitry may be configured to enhance the digital landmark registry based on the fourth set of predicted landmark boundary boxes and corresponding landmark labels.

In the implementation above, the landmarks in the geographic region may include buildings and swimming pools and the predetermined set of landmark types correspondingly comprise a building type and a swimming pool type.

In each of the implementations above, the first filter may be configured to filter the second set of predicted landmark boundary boxes by identifying roads in the aerial blocks based on the map blocks, identifying predicted boundary boxes among the second set of predicted landmark boundary boxes that are of the swimming pool type and that overlap with the roads as erroneously predicted boundary boxes by the multilayer landmark recognition and segmentation convolutional neural network, and removing the erroneously predicted landmark boundary boxes from the second set of predicted landmark boundary boxes to generated the third set of predicted landmark boundary boxes. Alternatively, the first filter may be configured to filter the second set of predicted landmark boundary boxes by identifying predicted landmark boundary boxes among the second set of predicted landmark boundary boxes that are of the swimming pool type and that overlap with buildings identified based on the map blocks as erroneously predicted boundary boxes by the multilayer landmark recognition and segmentation convolutional neural network, and removing the erroneously predicted landmark boundary boxes from the second set of predicted landmark boundary boxes to generated the third set of predicted landmark boundary boxes.

Additionally or alternatively in each of the implementations above, the first filter may be configured to determine that a predicted landmark boundary box of the swimming pool type overlaps with a building when a percentage of the predicted landmark boundary box of the swimming pool type lying within a boundary box of the building is higher than a predetermined percentage threshold.

In each of the implementations above, the second filter may be configured to filter the third set of predicted landmark boundary boxes by identifying landmark boundary boxes among the third set of predicted landmark boundary boxes that are of the swimming pool type, identifying swimming pool boundary boxes that overlap, aggregating the overlapping swimming pool boundary boxes into a single boundary box, and replacing the overlapping swimming pool boundary boxes in the third set of predicted landmark boundary boxes with the single boundary box to generate the fourth set of predicted landmark boundary boxes.

In each of the implementations above, the first filter or the second filter may be configured to filter the second or third set of predicted landmark boundary boxes in a distributed manner wherein the second or third set of predicted landmark boundary boxes are filtered separately and in parallel between aerial blocks.

In each of the implementations above, the system circuitry is further configured enhance the digital landmark registry by converting locations of landmark boundary boxes in the fourth set of predicted landmark boundary boxes to geographical coordinates based on the aerial blocks and meta data associated with the aerial blocks, determining a subset of boundary boxes among the fourth set of predicted landmark boundary boxes that correspond to entries in the digital landmark registry according to the geographical coordinates, and determining tax non-conformity based on boundary box information of the subset of boundary boxes and size information contained in the digital landmark registry.

In each of the implementations above, the system circuitry, when configured to enhance the digital landmark registry based on the fourth set of predicted landmark boundary boxes by converting locations of landmark boundary boxes in the fourth set of predicted landmark boundary boxes to geographical coordinates based on the aerial blocks and meta data associated with the aerial blocks, determining a subset of landmark boundary boxes among the fourth set of predicted landmark boundary boxes that do not correspond to any entries in the digital landmark registry based on the geographical coordinates, and updating the digital landmark registry with the subset of landmark boundary boxes.

While each of the implementations above is directed to a system for training and/or using the multilayer landmark recognition and segmentation neural network model, the underlying principles applies to various corresponding methods for training and using such a model.

The implementations disclosed herein thus provide a technical solution for improving object recognition and segmentations accuracy by iteratively enhancing training dataset and by using a multistage training process. In particular, the training data set is generated in an initial stage by partially labeling a training aerial image and a corresponding landmark map. An intermediately trained model is used to generate additional training data with labeled landmarks that are further validated. The additional labels are combined with initial labels to generate an enhanced training dataset. The final model is trained using the enhanced training dataset. Furthermore, the model trained above is used in conjunction with various post-model filters to remove false positive object recognition. In such a manner, the model may be trained to reduce false negative object recognition without increasing complexity of the model. The potential increased number of false positives may be removed using the post-model filters. The object recognition and segmentation models disclosed herein may be used in landmark recognition and segmentation in aerial images, and other types of digital images objects other than landmarks.

DETAILED DESCRIPTION

Figure 1:
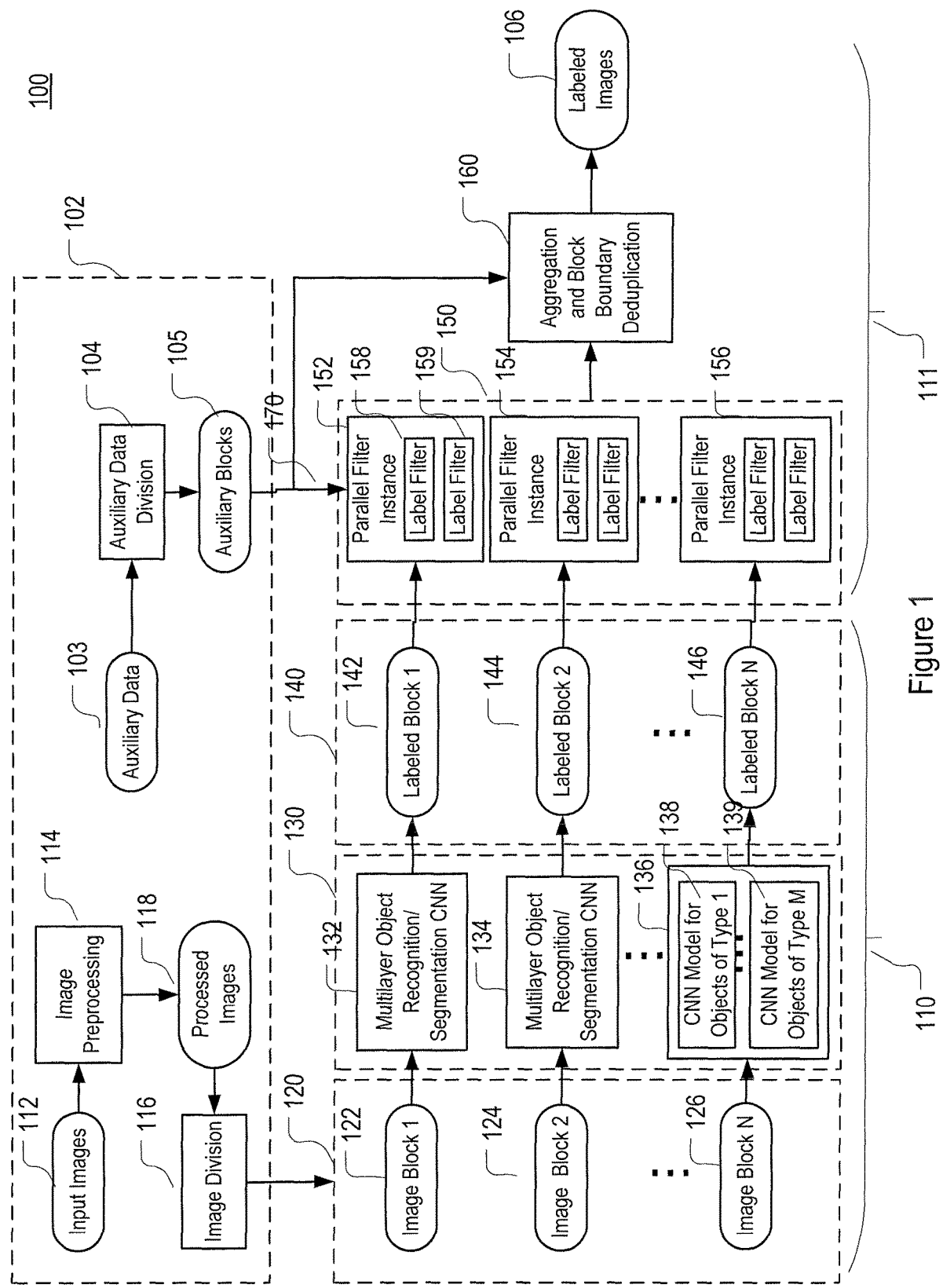
FIG. 1 illustrates an exemplary process flow and data pipeline for object recognition and segmentation in a digital image.

A digital image, for example, may include a two dimensional or three dimensional data matrix, representing image information in two or three spatial directions. Such a data matrix, may be further compressed and transformed into other data formats. Computer vision applied to a digital image may include decompressing the image to obtain the data matrix, and performing tasks for (1) identification of objects embedded in the image, (2) determination of locations of these objects within the image, and (3) identification of one or more boundaries for the objects by carrying out complex data analytics on the data matrix. The first task above may be alternatively referred to as object recognition. The latter two tasks involving locations and boundary identification and may be alternatively referred to as object segmentation.

Such data analytics for object recognition and segmentation may be based on, for example, one or more convolutional neural network (CNN) models containing a collection of, e.g., convolution, pooling, rectification, and fully connected layers. Connection between the elements, or neurons, within each layer and between the layers of a CNN may be represented by model parameters in the form of convolutional kernels or features, weights, biases, and other types of model parameters. These model parameters may be determined during a training process of the CNN model based on a set of training data. The training data may include training images labeled with locations and boundary boxes for various objects in the image that are pre-identified via other means. The training data are preferably domain specific to the types of images for which the CNN model will be deployed. Once the CNN model is trained with the training parameters determined, it may be deployed to process unlabeled images to intelligently recognize and segment objects therein.

Labeling of the training image with locations and boundary boxes for various objects may be based on additional auxiliary data. The labeling process may be automatic or manual. The auxiliary data may not be complete in that the auxiliary data may only contain location and boundary box information of a subset of objects that actually appear in the training image. As a result, not all the objects of the predetermined types in the images will be provided with labels. In other words, the training dataset may be only partially labeled. In one implementation, as will be described in more detail below, the training of the CNN models may be performed in multiple training stages. For example, an intermediate CNN model may be trained using the partially labeled training images in an initial training state. The training of the intermediate CNN model may be aimed at producing correct or near-correct label with an accuracy higher than a predetermined threshold. The trained intermediate CNN model may then be used to process the same set of training images and identify objects that are not pre-labeled in the training images. These objects may be validated through a separate validation process, and the validated objects will be treated as truth and their labels may be added to the training images to produce the same set of training images but with expanded updated, and enhanced object labels. This set of training images with updated labels may then be used to retrain the CNN model in a second training stage. This process may be iterated in multiple stages until no new labels are generated by the final CNN model.

A digital image may include multiple types of objects. A CNN model may be trained to recognize and segment one or more types of these objects depending on the application that the CNN model is designed for. For example, in a face detection application used by, e.g., a digital camera, the CNN model may be trained to only generally recognize and segment human faces in an input image. In some other applications, multiple types of objects may need to be recognized. For example, a particular application may require recognition and segmentation of both human faces and houses or other objects in an input image. In a first exemplary implementation, recognition and segmentation of multiple different types of objects may be performed by separate CNN models each trained for recognition and segmentation of one type of the multiple different types of objects. In a second exemplary implementation, a single integrated CNN model may be trained for recognizing the multiple different types of objects, and each of these recognized objects may be additionally segmented and labeled with corresponding object type among the different object types by the single integrated CNN model. While the first implementation relies on multiple CNN models, each model may be relatively less complex (e.g., requiring fewer convolutional layers and fewer training parameters) and recognition and segmentation of different types of objects of an input image may be processed in a parallel and distributed manner by the separately deployed CNN models. In comparison, the second implementation relies on a single model and may be less cumbersome to train.

Generally, CNN models trained for object recognition and segmentation may not be completely accurate. In other words, CNN models may produce false negatives and/or false positives. A false negative represents a miss in recognition of a particular object of a particular type that actually appears in an input image. A false positive represents identification of an object of a particular type that does not actually exist in the input image. In one implementation, however, the CNN models may be improved to reduce false positives and false negatives by adding more layers and more training parameters, and by pre-labeling a larger scope of training images in the training data set. In an alternative implementation, as will be described in more detail below, it may be more efficient to train the CNN models having a reasonable level of complexity and use a more moderate size of training data to achieve over-recognition of objects (such that object recognition error would be mostly false positives) and to then augment the trained CNN models with an additional auxiliary filter for removing at least some of the false positives. Such an auxiliary filter may utilize, e.g., other auxiliary or supplemental data indicating locations and regions in the input image where objects as recognized by the CNN models cannot exist. Such auxiliary or supplemental data may not be very useful to the training process of the CNN models because it may be difficult, if not impossible, to perform negative labeling (i.e., labeling the non-existence of an object) in training images. As such, these auxiliary or supplemental data may be best utilized for performing a variety of post-model filtering of false positives, as will be illustrated below.

The input digital images, depending on their types, may include objects of varying densities. Some input digital images may include densely populated objects that need to be recognized and segmented. In some situations, objects of the same type may blend together in high-density regions of the images without obvious or recognizable boundaries between the objects. Forcing an object recognition and segmentation model to be trained to recognize boundaries that virtually do not show up with some reasonable clarity in the training images may yield a poorly trained model. In one implementation described in more detail below, such objects may be aggregated as a single object in a training dataset for improving accuracy of the model.

An input image to a CNN model and/or a post-model filter may be large in size (e.g., 10's, 100's, 1,000's or more megabytes). Processing of large-size images by the CNN model during the training process and the deployment may take an exceedingly long time and may thus cause unacceptable delays in real-time applications. An implementation of the invention avoid these shortcomings by dividing large input images into image blocks. In addition, the auxiliary/supplemental data may also be divided into blocks. As such, multiple instances of the same CNN model and the same post-model filter may be deployed independently at a block level into distributed and parallel computing platforms/machines (e.g., distributed physical machines and/or virtual machines). In some implementations, the image blocks may be constructed such that neighboring blocks overlap with one another to some extent. The extent to which the blocks overlap may be pre-determined based on statistical characteristic of the objects to be identified such that, in most situations, if an object is only partially included in an image block (i.e., the object is cut by the block boundary), then this object will most likely show up in full in at least another adjacent image block. After objects are recognized and segmented in each image block, the labeled blocks may be combined, and an additional process for deduplication may be implemented to remove duplicate full and partial objects in the overlap regions between the blocks.

As described above, for recognizing and segmenting objects of different types in an input image, different CNN models may be trained such that each CNN model handles recognition and segmentation of one type of objects among the different types of objects. Training and deploying these distinct CNN models may be dispatched in a parallel manner into distributed physical or virtual computing resources. At the same time, for each of the distinct CNN models, the same model may be further dispatched in a parallel manner into distributed physical or virtual computing resources. As such, in one implementation, the CNN models for object recognition and segmentation may be distributed into parallel processes at two different levels to speed up the object recognition and segmentation processes, taking advantage of distributed computing architecture in, e.g., a cloud environment. The same parallel and distributed computing implementation may also be applied to the post-model filtering. In particular, distinct filters may be generated or trained for different types of objects and the filters may be run in parallel. At the same time, each filter may be run as multiple parallel and distributed instances, with each instance handling filtering and removal of false positives for one block.

The implementations introduced above thus provide an intelligent and distributed object recognition and segmentation solution for digital images trained in multiple training stages. Such object recognition and segmentation data analytics involve, e.g., one or more multilayer CNNs that are not merely computer implementations of human thought processes or what may be performed using pens and papers. The CNNs are trained in a computing device implemented specific multi-stage manner and implemented with specific post-model filters to enhance model accuracy and to improve training and deployment processing speed and efficiency. Such speed and efficiency improvement is not simply because the model is implemented in computers rather and by using pens and papers. Rather, such speed and efficiency improvements are achieved through specific arrangement of computing resources and adjusting data analytics algorithms in a particular manner and order. The improvement is thus technical and within computer technology itself.

FIG. 1 illustrates in more detail an exemplary process flow and data pipeline for object recognition and segmentation in a digital image based on a distributed multilayer object recognition and segmentation convolutional neural network model and distributed post-model filters. In FIG. 1 and other Figures that will be discussed below, square boxes are used to represent computer implemented processes, or steps, whereas rounded boxes are used to represent data or data structures that are inputs to or outputs of the processes.

The process flow and data pipeline 100 of FIG. 1 includes input image and auxiliary data preprocessing flow and pipeline 102, an object recognition and segmentation process flow and data pipeline 110, and a post-model filtering process flow and data pipeline 111. The input data for the process flow and data pipeline 100 may include but are not limited to unlabeled input images 112 and auxiliary data 103. The preprocessing flow and data pipeline 102 may include but are not limited to image preprocessing and data pipeline 114, and image division processing 116. The preprocessing flow and data pipeline 102 convert the input images 112 into processed images 118. The image division processing 116 then converts the processed images 118 into a plurality of image blocks 120 including but not limited to image blocks 122, 124, and 126. The image preprocessing and data pipeline 114 may, for example, perform decoding or decompression of compressed input images 112 into uncompressed 2D or 3D image data matrices. In the situation that the input images 112 comprise spatial image tiles that collectively represent spatial distribution of objects in a collective space, the image division process 116 may be configured to divide the input images 112 into image blocks having partial spatial overlaps. In a similar fashion, the auxiliary data 103 may also be divided by the auxiliary data division process 104 into auxiliary blocks 105. Each of the auxiliary blocks 105 may correspond to one of the image blocks 122, 124, and 126.

Continuing with FIG. 1, the object recognition and segmentation process flow and data pipeline 110 may include using a pre-trained multilayer object recognition and segmentation CNN model 130 to process the image blocks 120 (including but not limited to image blocks 122, 124, and 126) to generate labeled image blocks 140 including but not limited to labeled image blocks 142, 144, and 146, each labeled with recognized and segmented objects. The labels for the objects may include but are not limited to locations of the objects in the image blocks (e.g., pixel locations), boundaries of the objects, and types of objects. The locations of the objects, for example, may comprise centers-of-pixels of the recognized objects. The boundaries of the objects, depending on the complexity of the multilayer CNN model 130, may comprise simple boundary boxes with polygonal or other geometric shapes for approximating the object boundaries, or may comprise more elaborated contours of the objects. The boundaries may, for example, be specified by an array of pixel values relative to the image blocks. The objects may be of a predefined set of object types. Each recognized object may be labeled with at least one of the predefined set of object types.

The multilayer object recognition and segmentation CNN model 130 of FIG. 1 may be implemented as multiple independent instances 132, 134, and 136. Each of these instances may be instantiated to handle object recognition and segmentation of one of the image blocks 122, 124, and 126. As such, the independent instances of the CNN model 132, 134, and 136 may be implemented in a parallel manner using distributed physical or virtual computing resources. In addition, one or more of instances of the CNN model 130 may be implemented as an integrally trained single CNN model for recognition and segmentation of objects of the predetermined set of object types, as shown by instances 132 and 134. Alternatively, one or more instances of the CNN model 130 may include separate CNN models each trained for recognizing and segmenting one of M types of objects, as shown by the models 138 and 139 within the CNN instance 136.

As shown by a filtering flow process and data pipeline 150 of FIG. 1 as part of the post-model data flow and data pipeline 111, the labels for the recognized objects of different types as generated by the CNN model instances 132, 134, and 136 maybe further be filtered to remove at least some false positives. In one implementation, the filter may be implemented in parallel filter instances 152, 154, and 156. Each of these instances may be instantiated independently and in a parallel manner in distributed physical or virtual computing resources. Each of these filter instances may include multiple filters (such as label filters 158 and 159) each configured to filter false positive objects of a particular object type. A filter configured to filter false positive objects of a particular type may further be implemented with different sub filtering function configured to filter false positive objects of a particular type under different contexts in the image (an example will be given blow with respect to FIGS. 5 and 6).

As shown by arrow 170 in FIG. 1, the filtering flow process and data pipeline 150 may be augmented by data from the auxiliary blocks 105. The data from the auxiliary blocks, for example, may indicate pixel regions in the image blocks that cannot contain objects of particular types. Such auxiliary or supplemental data may not be very useful to the training process of the CNN models because it may be difficult, if not impossible, to preform negative labeling (labeling non-existence of an object) in training images. As such, these auxiliary or supplemental data may be best utilized for performing a variety of post-model filtering of false positives, as will be described in more detail below with respect to FIG. 5 in a particular context of landmark filtering.

The post-model filtering process flow and data pipeline 111 may further include process 160 for aggregating the filtered labels of various image blocks, and in the situation where the image blocks are partially overlapping, for removing duplicate labels in the overlap regions. The output of the aggregation and deduplication process 160 is final labeled images 106.

Figure 2:
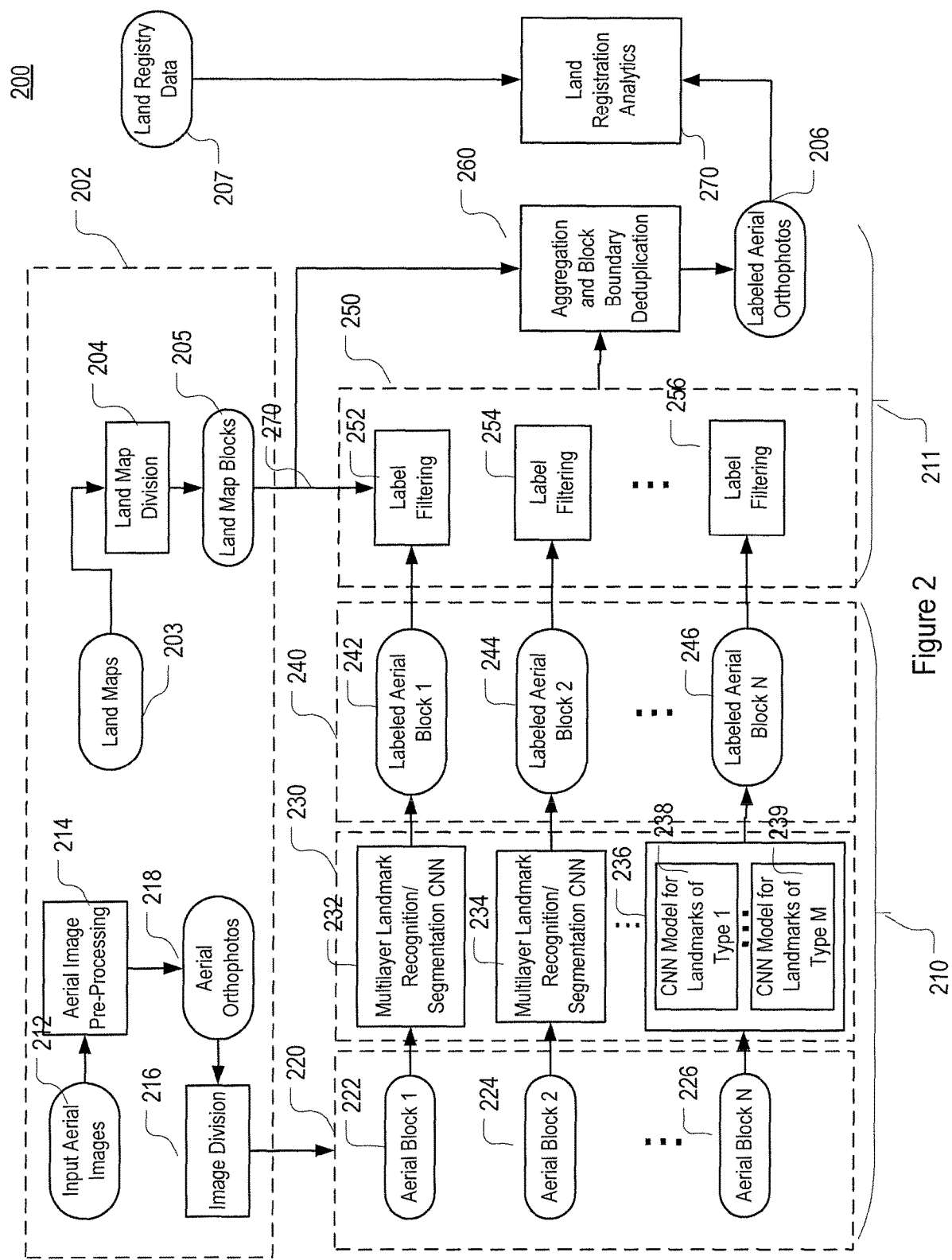
FIG. 2 shows an exemplary process flow and data pipeline for landmark recognition and segmentation in aerial images and land maps.

FIG. 2 illustrates an example for applying the process flow and data pipeline of FIG. 2 to a specific context of landmark recognition and segmentation in aerial images of land. The process flow and data pipeline 200 of FIG. 2 includes input aerial image and land map preprocessing flow and data pipeline 202, a landmark recognition and segmentation process flow and data pipeline 210, a post-model filtering process flow and data pipeline 211, and a landmark registration analytics process 270.

The input data for the process flow and data pipeline 200 may include but are not limited to unlabeled input aerial images 212 and land maps 203. The preprocessing flow and data pipeline 202 may include but is not limited to aerial image preprocessing 214 that converts the input aerial images 212 into aerial orthophotos 218, and aerial image division process 216 to convert the orthophotos 218 into a plurality of aerial blocks 220 including but not limited to aerial blocks 222, 224, and 226. The aerial image preprocessing 214 may, for example, further perform decoding or decompression of compressed input aerial images 212 into uncompressed aerial image data matrices before generating orthophotos. The input aerial images 212 may be taken by satellites or by drones flying over land. Because the raw aerial images are each taken from a single point perspective by satellites or drones, they may be first processed and converted to orthophotos by the aerial image pre-processing flow 214. Compared to original aerial images, the aerial orthophotos 218 are geometrically corrected or "ortho-rectified" such that the scale of the photograph is uniform and each landmark in the photo is shown as if it is viewed from a point directly above it. An orthophoto is thus photographic version of a typical land map.

Figure 3:
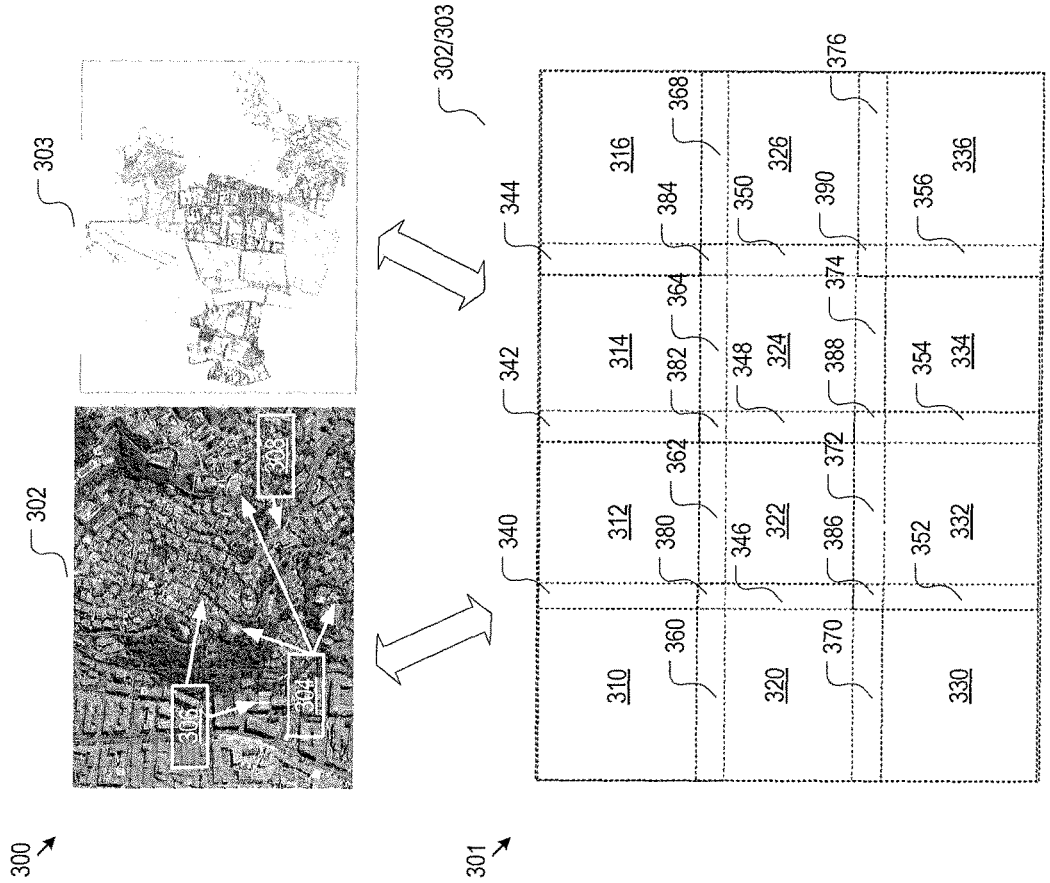
FIG. 3 illustrates preprocessing the aerial images and land maps of FIG. 2 into overlapping aerial blocks or land map blocks for facilitating implementation of the landmark recognition and segmentation process of FIG. 2.

An example of an orthophoto is shown by 302 of FIG. 3. The orthophoto 302 may include various landmarks of interest. A set of types of landmarks of interest may be predefined according to specific application scenarios. For example, in an application used by an administrative district to monitor and enforce land use regulations, tax codes, and environmental policies, the set of types of landmarks of interest may be defined as including but not limited to buildings (e.g., as indicated by arrows 306), swimming pools (e.g., as indicated by arrows 304), roads (e.g., as indicated by arrow 308), and solar panels (examples not shown in FIG. 3 due to limited image resolution in presenting the exemplary orthophoto). The orthophoto 302 may be generated from stitching and pre-processing multiple aerial images taken from satellites and drones. A single orthophoto 302 may be generated to represent an entire region or districts of interest. Alternatively, there may be multiple orthophotos generated for covering a region or districts of interest.

Each of the land maps (203 of FIG. 2) may include one or more layers of a set of land map layers. These layers may include but are not limited to land zoning layer, property plan layer, land structure layer, surface road layer, terrain layer, school districting layer, and the like. A particular region may be associated with one or more land maps each including one or more layers. Landmarks may be labeled in the various layers of a land map. Land maps and their layers may be created manually as map drawings. These drawings may be scanned and stored as digital images. Alternatively, land maps and their layers may be computer generated from an underlying database and stored as electronic files of predetermined formats. The underlying database may be used to store information for landmarks and other land features, including but not limited to their locations (e.g., geolocations), size, boundary box, and elevations. An example of a land map with land planning and real estate property layers are shown by 303 of FIG. 3.

Returning to FIG. 2, the image division process 216 of FIG. 2 may be then configured to divide the aerial orthophotos 218 (e.g., orthophoto 302 of FIG. 3) into aerial blocks 220 having partial spatial overlaps. In a similar fashion, the corresponding land maps 203 (e.g., land map 303 of FIG. 3) may also be divided by the land map division process 204 into land map blocks 205. Each of the land map blocks 105 may correspond to one of the aerial blocks 222, 224, and 226.

An exemplary division of the aerial orthophotos 218 and land map 203 into blocks is illustrated in 301 of FIG. 3. For example, the aerial orthophoto 302 or the land map 303 may be divided into blocks 310, 312, 314, 316, 320, 322, 324, 326, 330, 332, 334, and 336. Adjacent blocks may partially overlap, as shown by two-block overlapping regions 340-379, and four-block overlapping regions 380-390. The size of blocks 310-336 may be predefined based on desired complexity of the CNN model of FIG. 2. In one implementation, each pixel of the orthophotos may correspond to 20×20 square centimeters of real land space, and the block size may be predetermined at, e.g., 100 meters. Each orthophoto block, thus may comprise 500 by 500 pixels of image data. The size of the overlap regions 340-390 may be predetermined based on the typical size of landmarks to be recognized and segmented. It may be predetermined, for example, that in most instances if a landmark is only partially included in an aerial block (i.e., the landmark is cut by the block boundary), this landmark will most likely show up in full in at least another adjacent aerial block. For example, when the landmarks of interest are residential buildings, swimming pools, and the like, the size of the overlapping regions 340-390 may be predefined at around 10 meters (e.g., 50 pixels). The predetermined sizes above are merely examples, other sizes for the aerial blocks and overlap regions are contemplated. Further, while the example given in FIG. 3 includes blocks of a regular square or rectangular shape for more convenient data analytics, other alternative shapes for the aerial blocks and land map blocks may be used. For example, the orthophotos 302 and the land maps 303 may be divided according to boundaries of irregularly shaped districts, such as school district.

Returning to FIG. 2, the landmark recognition and segmentation process flow and data pipeline 210 may include using a trained multilayer landmark recognition and segmentation CNN model 230 to process the aerial blocks 220 (including but not limited to aerial blocks 222, 224, and 226) to generate labeled aerial blocks 240 including but not limited to labeled aerial blocks 242, 244, and 246, each labeled with recognized and segmented landmarks. The labels for the landmarks may include but are not limited to locations of the landmarks in the aerial blocks (e.g., pixel locations), boundaries of the landmarks, and types of landmarks. The locations of the landmarks, for example, may comprise centers-of-pixels of the recognized landmarks. The boundaries of the landmarks, depending on the complexity of the multilayer CNN model 230, may comprise simple boundary boxes with polygonal or other geometric shapes for approximating boundaries of the landmarks, or may comprise more elaborated contours of the landmarks. The boundaries may, for example, be specified by an array of pixel values relative to the aerial blocks. The landmarks may be of a predefined set of landmark types. Each recognized landmark may be labeled with at least one of the predefined set of landmarks types. The predefined set of landmark types may include but are not limited to buildings, swimming pools, and solar panels.

The multilayer landmark recognition and segmentation CNN model 230 of FIG. 2 may be implemented as multiple independent instances 232, 234, and 236. Each of these instances may be instantiated to handle landmark recognition and segmentation of one of the aerial blocks 222, 224, and 226. As such, the independent instances of the CNN model 232, 234, and 236 may be implemented in a parallel manner using distributed physical or virtual computing resources. In addition, one or more of instances of the CNN model 230 may be implemented as an integrally trained single CNN model for recognition and segmentation of landmarks of the predetermined set of landmark types, as shown by instances 232 and 234. Alternatively, one or more instances of the CNN model 230 may include separate CNN models each trained for recognizing and segmenting one of M types of landmarks, as shown by the models 238 and 239 within the CNN instance 236.

As shown by a filtering flow process and data pipeline 250 of FIG. 2 as part of the post-model data flow and data pipeline 211, the labels for the recognized landmarks of different types as generated by the CNN model instances 232, 234, and 236 maybe further filtered to remove at least some false positives. In one implementation, the filter may be implemented in parallel filter instances 252, 254, and 256. Each of these instances may be instantiated independently and in a parallel manner in distributed physical or virtual computing resources. Each of these filter instances may include multiple filters each configured to filter false positive landmarks of a particular landmark type. A filter configured to filter false positive landmarks of a particular type may further implement different sub filtering functions configured to filter false positive landmarks of a particular type appearing in different contexts in the aerial block (an example will be given blow with respect to FIGS. 5 and 6).

As shown by arrow 270 in FIG. 2, the filtering flow process and data pipeline 250 may be augmented by data from land map blocks 205. The data from the land map blocks, for example, may indicate pixel regions in the corresponding aerial blocks that cannot contain landmarks of particular types. For example, a landmark of swimming pool detected at a location in an aerial block overlapping with a road or highway as indicated by the corresponding land map block may suggest that such detected swimming pool is likely a false positive. For example, the falsely detected swimming pool may actually be a motor vehicle on the road or highway. For another example, a landmark of swimming pool detected at a location in an aerial block overlapping with a building as indicated by the corresponding land map block may suggest that such detected swimming pool is likely a false positive and may actually be a set of solar panels installed on the roof of the building. More specifics of filtering out false positive swimming pools will be described below with respect to FIGS. 5 and 6.

Figure 9:
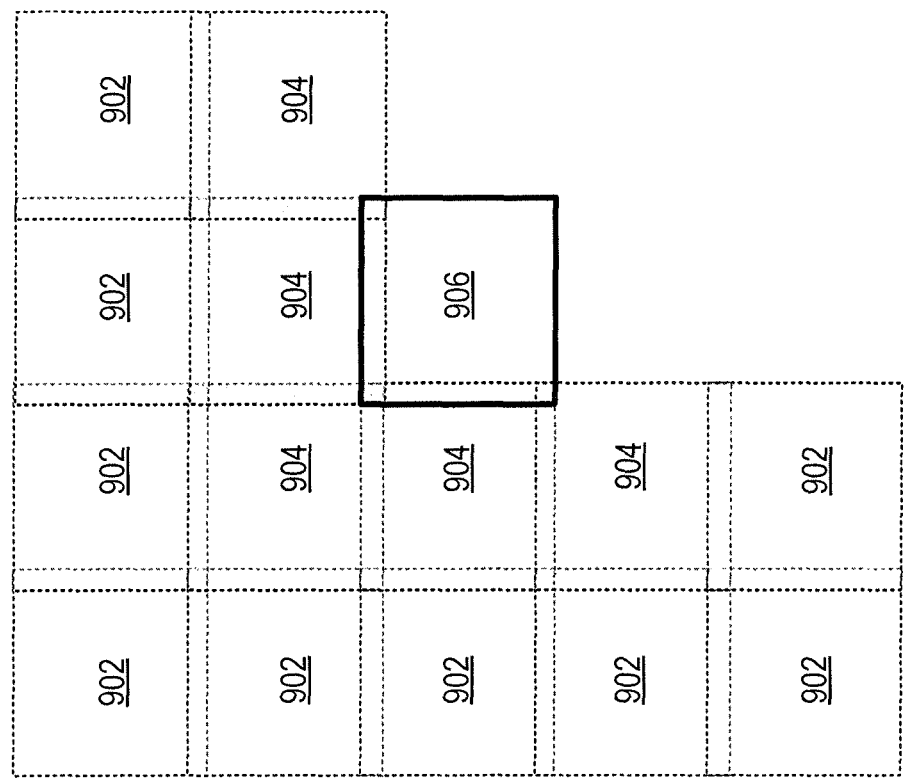
FIG. 9 illustrates an exemplary deduplication process for landmarks running across overlapping regions between aerial blocks in FIG. 3.

The post-model filtering process flow and data pipeline 211 may further include process 260 for aggregating the filtered labels of various aerial blocks and for removing duplicate labels of landmarks in the overlap regions. The output of the aggregation and deduplication process 260 is final labeled orthophotos 206. An exemplary implementation of the deduplication process 260 for landmarks across block boundaries is illustrated in process 900 of FIG. 9. Specifically, the aerial blocks labeled and filtered by landmark recognition and segmentation process flow and data pipeline 210 and post-model filtering process flow and data pipeline 211 may be scanned for duplicates at boundaries by process 260 sequentially. For example, aerial blocks 902 and 904 illustrate blocks that have been sequentially scanned (labels across block boundaries have been deduplicated) by process 260 up to a current aerial block 906. The process 260 then proceed to scan the current block 906 by detecting duplicate landmarks across boundaries between block 906 and its neighboring blocks 904. In some implementations, duplication labels across block boundaries may be identified by evaluating overlap between recognized boundary boxes of landmarks in overlap regions of the aerial blocks. If two boundary boxes overlap at all or overlap more than a predetermined absolute or relative (e.g., percentage) threshold level in an overlap region of the aerial blocks, they may be merged as one boundary box in the final labeled orthophotos 206. The scanning process in 900 progresses until all aerial blocks are processed. The aerial blocks may be scanned in any order such that all the overlapping regions between the aerial blocks are processed.

FIG. 2 further illustrates a land registration analytics step 270 for, e.g., updating a land registry by comparing information from the land registry data 207 and information according to the landmarks recognized and segmented by the process flow and data pipeline 210 and 211. The process 270 may thus include a land registry enrichment function in which updating of land registry data may be performed automatically and intelligently from updated aerial images. An exemplary implementation of land registry enrichment will be provided with respect to FIG. 7. In another implementation, the land registration analytics step 270 may further include a function for identifying tax non-conformity, by analyzing the information provided from the landmarks recognized and segmented by the process flow and data pipeline 210 and 211 in comparison with tax information included in the land registry data 207. An exemplary implementation of tax non-conformity detection will also be described below with respect to FIG. 7.

Figure 4:
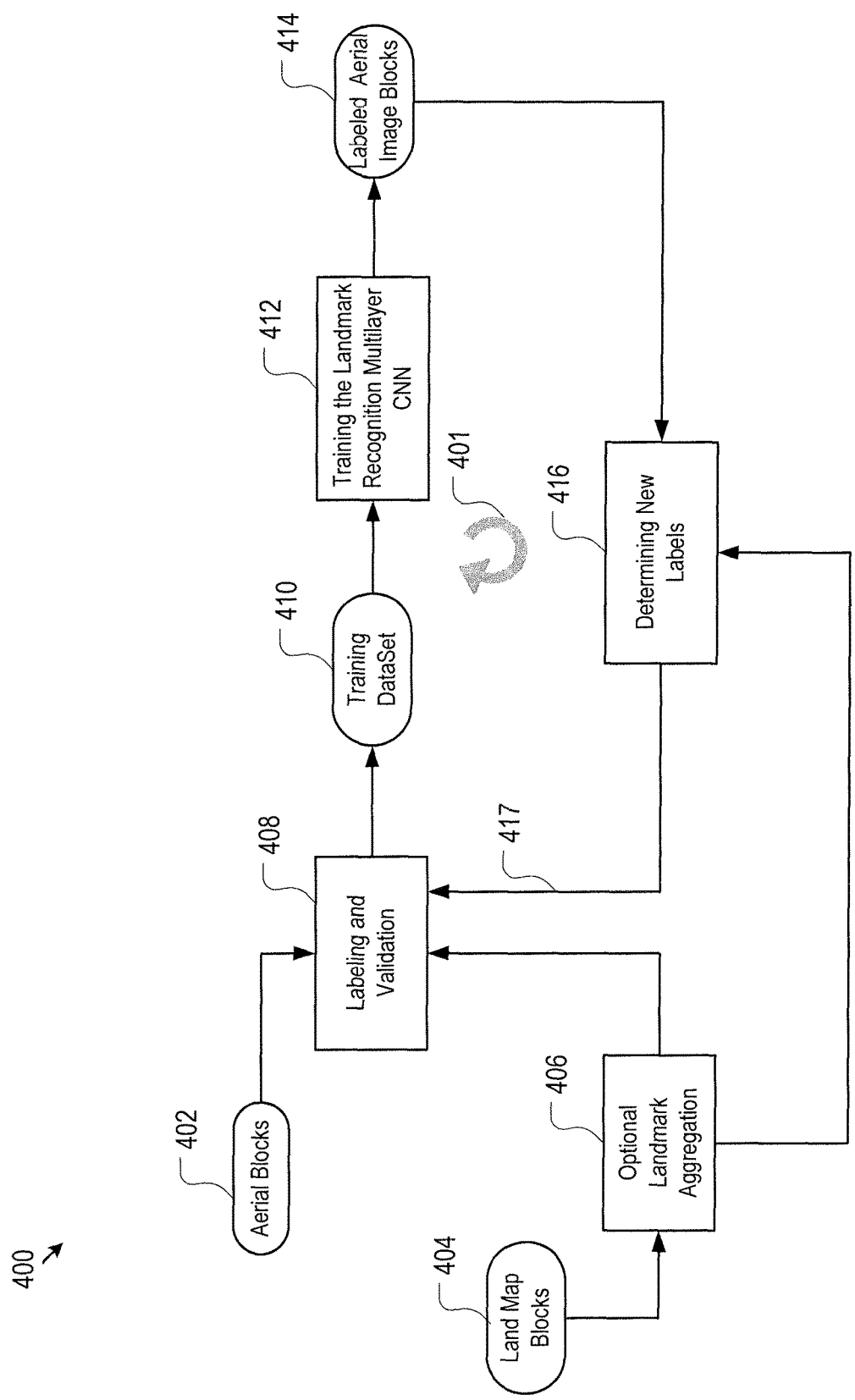
FIG. 4 illustrates an exemplary process flow and data pipeline for self-validating and multi-stage training of the multilayer landmark recognition and segmentation convolutional neural network of FIG. 2.

FIG. 4 illustrates an exemplary process flow and data pipeline for training the multilayer landmark recognition and segmentation convolutional neural network 230 of FIG. 2. In this particular implementation, the training may be performed in multiple consecutive repeating stages, each represented by a training loop 401. Each stage of the training includes inputting a training dataset 410 into a training process 412 for the CNN model. Each stage of training generates one intermediate CNN model and the final stage generates the final CNN model for deployment for actual landmark recognition and segmentation. In each stage, the training dataset may be enhanced, expanded, and augmented from the training dataset from a preceding stage by incorporating predicted landmarks by the preceding intermediate model that were not labeled in training dataset of the preceding stage (416-->408-->410). These predicted landmarks are added into the current training dataset after being validated (408). As such, this training process of the CNN model may be referred to as a self-validating multi-stage training process.

Prior to an initial training stage of the multilayer landmark recognition and segmentation CNN model, landmarks appearing in aerial blocks 402 may first be labeled and validated by a labeling and validation process 408 to generate a training dataset 410 for the initial training stage. The labeling and validation process 408 may be facilitated using land map blocks 404. In particular, patches in the aerial blocks corresponding to known landmarks of the predetermined set of types of landmarks in the various layers of the map blocks may be labeled. Such labeling process may be automatically performed by computers which read the aerial blocks 402 and land map blocks 404 from a data storage or memory. In the scenario where the land maps are generated from an underlying database, the underlying database may be read alternative to or in addition to the land blocks, and the data items read from the database may be directly used for the labeling and validation process 408. In the scenario where the land maps are in the form of scanned manual maps, a separate model (such as a CNN model) may be constructed and used to identify landmarks in the manual map.

The validation process within 408 is intended to improve labeling accuracy so that the CNN model is not trained using training dataset including unacceptable number of wrong labels. Specifically, there may be discrepancy for particular landmarks between the aerial blocks and the land map blocks. For example, landmarks may have been altered as reflected in the aerial blocks (e.g., an addition has be built and attached to a residence building) since the current land map was generated. Labeling some landmarks in the aerial blocks with corresponding outdated data for these landmarks in the map blocks and using such labels in the initial training stage may lead to generation of an inaccurate first intermediate landmark recognition and segmentation CNN model. The validation process 408 for removal of discrepant labels of the initial training dataset may be performed manually. For example, landmark labels that are indicated by the land map and/or the underlying database for the land map but are not reflected by any corresponding objects in the area map may be removed. As such, landmarks in the initial training dataset may not all be labeled. Unlabeled landmarks may include, for example, landmarks that are not included in the land map (e.g., new landmarks) or landmarks that are misplaced in the land map.

The initially labeled and validated training dataset may then be used to train the first intermediate multilayer landmark recognition and segmentation CNN model in the initial training stage, as indicated in 412 of FIG. 4. The training process 412, for example, may include forward-propagating the aerial blocks in the initial training dataset through the multiple layers of the CNN model to the last output label layer, computing a loss function based on the output labels and the labels in the initial training dataset. The training process 412 may further include back-propagating the loss function through the neural network, adjusting the training parameters (e.g., convolutional kernels/features, weights, and biases) at each CNN layer to reduce the loss function using gradient decent. Each of the training aerial blocks may be forward-propagated and back-propagated in multiple iterations through the CNN layers. An overall set of model parameters may be determined by optimizing accuracy of label prediction for all training aerial blocks such that the prediction error compared to the labels is smaller than a predetermined error threshold.

The output 414 of landmark labels from the first intermediate CNN model trained using the initial training dataset may include landmark labels that are consistent (as it should be) with the labels included in the initial training dataset. However, the first intermediate CNN model may additionally recognize and output labels for landmarks that are not in the land map blocks 404 used to generating the initial training data labels. Further, the first intermediate CNN model may also recognize and output labels for landmarks that are misplaced in the land map block 404. These labels may be referred to as new labels or corrected labels and may be determined in process 416.

These new labels as determined by process 416 may be further used to enhance the initially labeled training dataset, as shown by arrows 417 and the labeling and validation process 408, to form a second training dataset 410 that is enhanced from the initial training dataset for training a second intermediate CNN model via process 412 in a second training stage. Again, to improve modeling accuracy, the new labels may need to be validated as part of process 408 and only validated new labels should be added to the second training dataset. Such validation process, may be performed manually to ensure that the new labels and corrected labels recognized by the first intermediate CNN model are reflected by corresponding landmarks in the aerial block. Alternatively, as described below, validation may be achieved automatically through the iterative training process with gradually enhanced labels as indicated by 401.

Once the second training dataset 410 is prepared, the second intermediate CNN model may be trained in the training process 412 similar to the training of the first intermediate CNN model. In one implementation, the second intermediate CNN model may have the same layer architecture as the first intermediate CNN model already trained. As such, the initial values of the training parameters of the second intermediate CNN model may be set as the already trained parameter values in the first intermediate CNN model. As such, the training of the second intermediate CNN model may be sped up. In some other implementations, the second intermediate CNN model may comprise a layer architecture that is different from the first intermediate CNN model. In such implementations, it may not be possible or may be inconvenient to reuse the already trained model parameters for the first intermediate CNN model and the training of the second intermediate CNN model may start with, e.g., randomly initialized training parameters.

Once the second intermediate CNN model is trained, it may generate new landmark labels for the training aerial blocks that are not in the labels in the second training dataset. Further, the second intermediate CNN model may also recognize and output labels for landmarks that are misplaced in the second training dataset. These new or corrected labels may then be validated and used to enhance the second training data set to form a third training dataset 410 via process 408 for training a third intermediate CNN model via process 412 in a third training stage. The multi-stage and self-validating training process described above may continue until, e.g., no new or corrected labels or only new or corrected labels smaller than a predetermined absolute or relative number are predicted by the last training stage. The final CNN model may then be deployed for landmark recognition and segmentation of unlabeled aerial blocks. This iterative process of validating and enhancing the training dataset may lead to more accurate final model. The final training dataset contains labels that may be used to update and enhance the corresponding land map and/or the underlying database for generating the land map.

In some implementations, the CNN model training process above may further include a landmark aggregation process 406, as illustrated in FIG. 4. This process may be added to improving accuracy in labeling of the aerial blocks 402 via process 408 to obtain the training dataset 410. In particular, some landmarks may be densely populated in aerial blocks. These landmarks may be further connected together or may be close to each other and with similar appearance such that they are difficult to separate and differentiated in the aerial blocks. Because these landmarks do not have distinct features among them, labeling them as separate landmarks may lead to poor modeling by forcing the CNN model to identify landmark boundaries that virtually do not exist in the training data during training process. The added aggregation process 406 solve this problem by aggregating multiple adjacent similar landmarks into a single landmark. These aggregated landmarks may then be used to label the aerial blocks by the labeling and validation process 408 for generating the training dataset 410. The aggregation process 406 may be performed manually or automatically via any other means.

Figure 5:
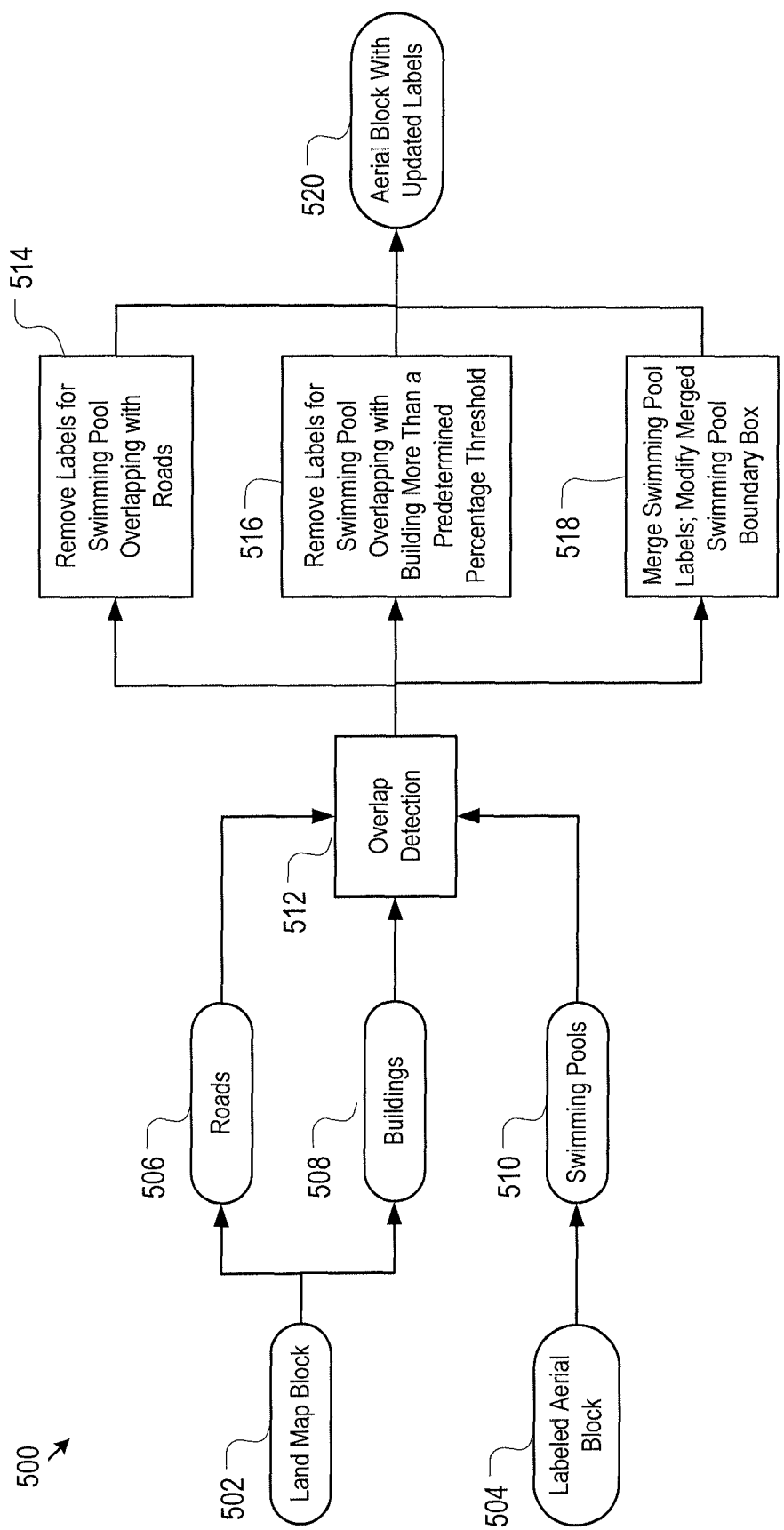
FIG. 5 illustrates an exemplary process flow and data pipeline for filtering landmark labels generated by the multilayer landmark recognition and segmentation convolutional neural network of FIG. 2 to generate updated labels.
Figure 6:
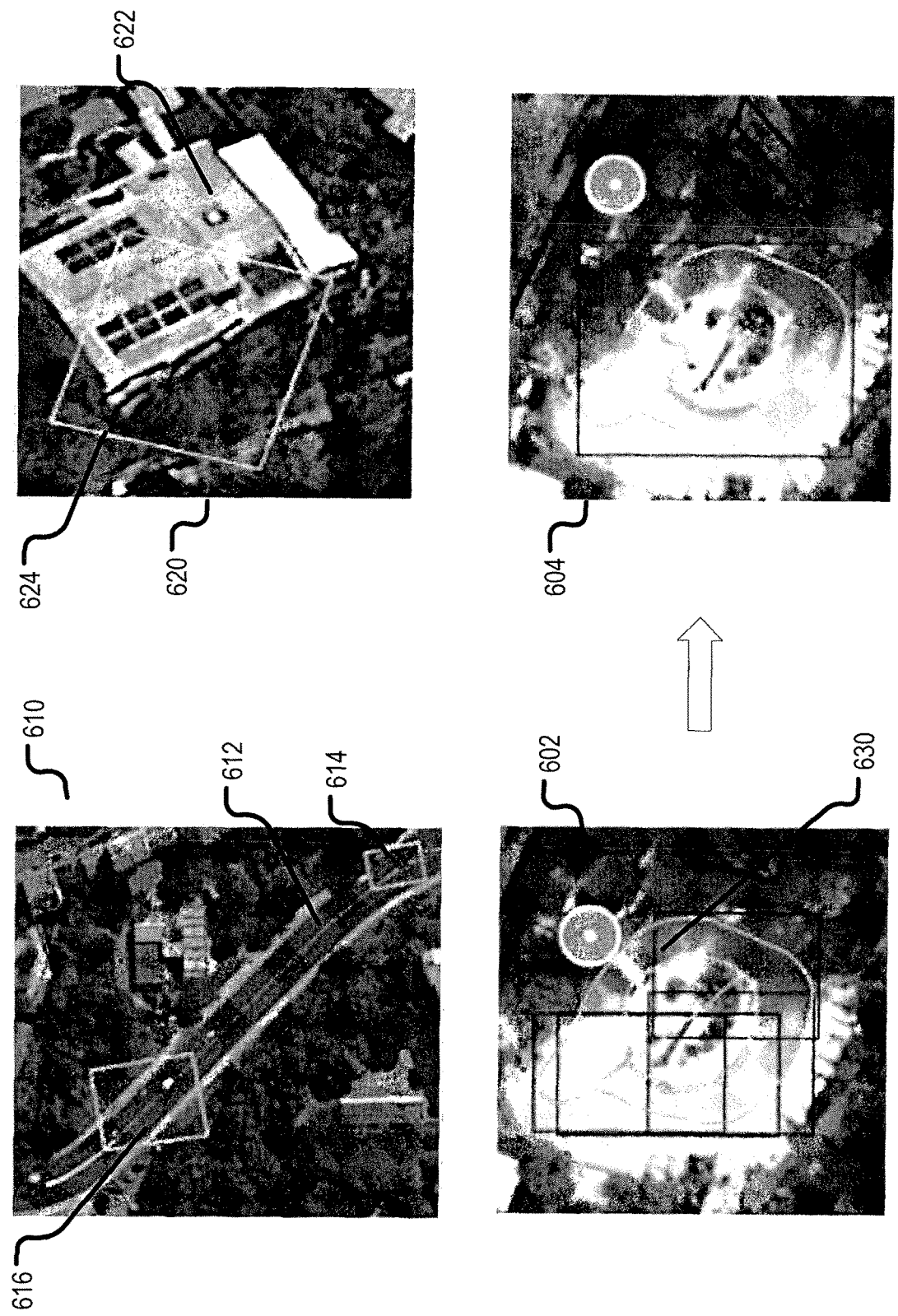
FIG. 6 graphically illustrates exemplary types of post-model filtering of landmark labels in FIG. 5.

FIGS. 5 and 6 further illustrate exemplary implementations for the post-model filtering process and data pipeline 211 of FIG. 2 to, e.g., to remove false positive identification of landmarks (514, 516, and 518) and generate aerial blocks with update labels (520). In particular, features such as roads 506 and buildings 508 on which some types of landmarks such as swimming pools 510 cannot exist may be first identified from land map blocks 502. The labeled aerial block 504 by the CNN model described above may be analyzed to identify these types of labeled landmarks (such as swimming pools 510). An overlap detection process 512 may then be used to determine overlapping between these labeled landmarks 510 and features 506 and 508. The detected overlapping may then be used for filtering and removing some of the labeled landmarks 510 as false positives. For example, process 514 may be used to remove labeled swimming pools in the labeled aerial block 504 that overlaps with roads 506 as false positives. These false positives may be a result from false recognition and segmentation of motor vehicles and other features on roads and mischaracterizing them as swimming pools. Because swimming pools are not typically built on roads or even near roads, they may be considered false positives when there are even slight overlaps between them and roads. This is further illustrated by 610 of FIG. 6, where a motor vehicle 616 and another feather 614 may be falsely identified in the labeled aerial block as a swimming pool. Because the labeled swimming pools 614 and 616 are detected as being on road 612, they may be removed from the labels as false positives.

As another example illustrated by process 516 of FIG. 5, swimming pools labeled in the labeled aerial block may be removed if they are detected to overlap with a building more than a predetermined percentage threshold. In particular, the CNN model may falsely identify solar panels installed on roofs as swimming pools, as shown by 620 of FIG. 6 (where solar panels 624 on the roof of building 622 may be recognized and segmented by the CNN model as a swimming pool). As such, the process 516 facilitates improving labeling accuracy by removing such false positives. A filter criterion of overlapping percentage may be pre-established. In one implementation, a minimum overlapping percentage threshold may be predetermined for such filtering. For example, a labeled swimming pool is removed as false positive only when it overlaps with a building by at least, e.g., 70%. The percentage threshold may not be need to be 100% or close to 100%. A percentage threshold lower than 100% may provide some tolerance to CNN model inaccuracy. In particular, a set of solar panels installed on the roof of a residential building may be recognized as swimming pool by the CNN model. The segmentation by the CNN model may not be completely accurate, leading to a detected overlapping between the falsely identified swimming pool and the residential building to be less than 100%. Using a percentage threshold of 100% or close to 100%, such solar panel falsely identified as swimming pools may not be considered false positive and the process 516 may fail to remove such false swimming pool identification. Likewise, the percentage threshold may be predetermined to a value that is not too small. Otherwise, a real swimming pool by a residential building may be removed inadvertently due to segmentation inaccuracy of the CNN model. In some implementations, the minimum percentage threshold value for the filtering and removal process 516 may be set at a value between 30% and 70%.

FIG. 5 further includes another exemplary post-model filtering process 518 that are used to remove false positives in a different manner for different reasons compared with the filtering processes 514 and 516. In particular, process 518 is used to remove, e.g., swimming pools that are duplicatively recognized and segmented. In particular, the overlapping detection process 512 may identify multiple swimming pools that overlaps by themselves, as further illustrated in 602 of FIG. 6. These overlapping swimming pools are most likely a single swimming pool that is falsely identified by the CNN model as multiple swimming pools due to, e.g., an irregular shape of the pool and/or other features appearing in the swimming pool (such as the island structure 630 in FIG. 6). The process 518 of FIG. 5 thus may be used to merge these falsely identified swimming pools into a single swimming pool, and generate a merged single boundary for the single swimming pool, and update the labels. This merging process is further illustrated in 604 of FIG. 6, where the multiple boundary boxes in 602 of FIG. 6 becomes a single boundary box.

While the filtering processes 514, 516, and 518 in FIG. 5 are shown as being implemented in parallel, they may be implemented sequentially. For example, filtering process 514 may be implemented first, followed by filtering process 516, followed by filtering process 518. Filtering processes 514, 516, and 518 may be alternatively implemented in any other sequential order or any other serial-parallel combinations.

Figure 7:
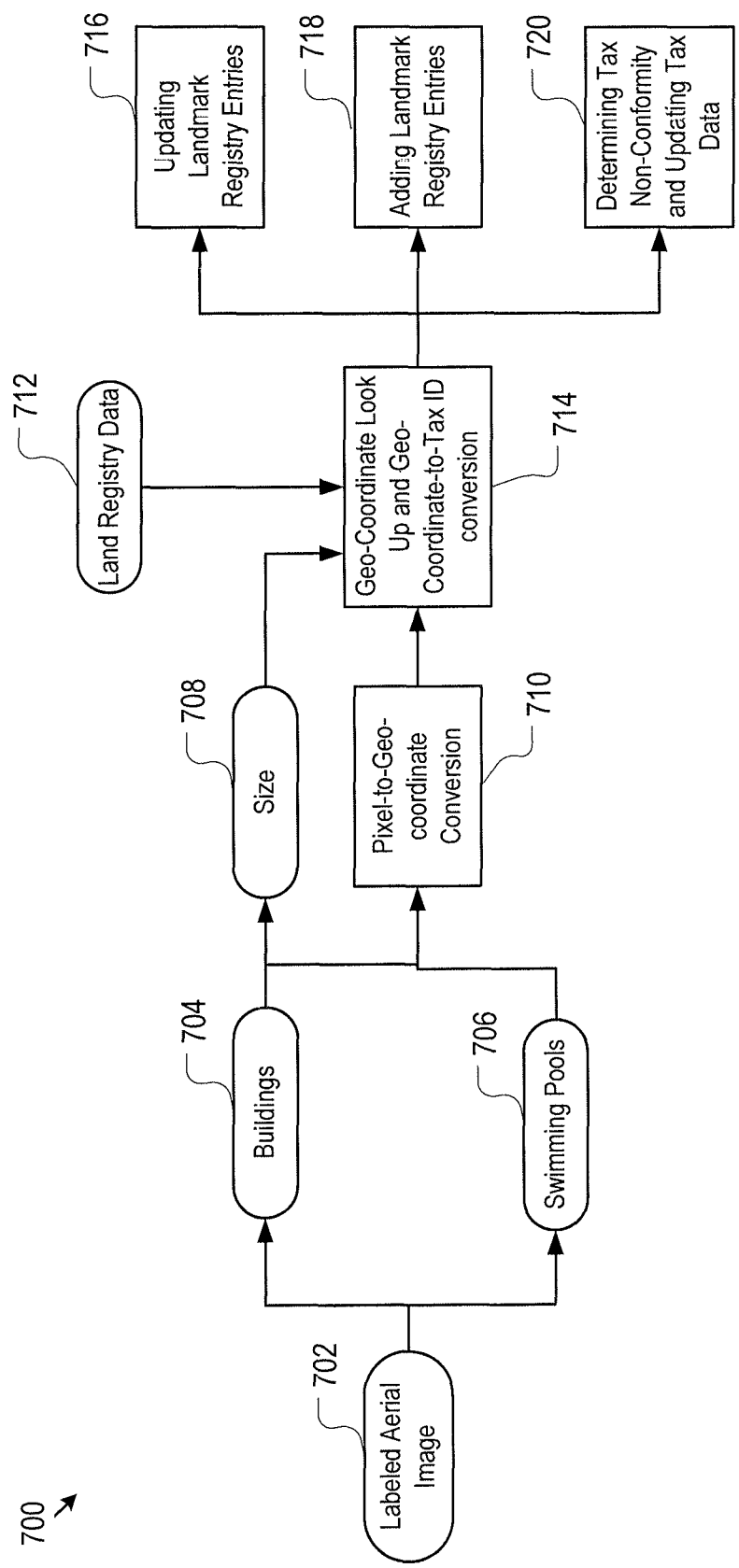
FIG. 7 shows an exemplary application of the landmark recognition and segmentation system of FIG. 2 for updating digital landmark registry and for detecting property tax non-conformity.

FIG. 7 further illustrates an exemplary data analytics application of the landmark recognition and segmentation system of FIG. 2 for updating digital landmark registry and for detecting property tax non-conformity. In particular, tax-implicating landmarks including but not limited to buildings 704 and swimming pools 706 may be identified from the labeled aerial image generated by the CNN model. The data analytics, for example, may include determination of the size 708 of the buildings and swimming pools from the boundary boxes or contours. The data analytics may further include converting location components of the labels for the buildings and swimming pools into geo-coordinates in process 710. The geo-coordinate information may be used as key to identify tax identifications from land registry data 712 in process 714.

Continuing with FIG. 7, once the tax identifications are found, the corresponding entries in the land registry data may be updated in process 716 (with size and other updated information). In addition, for the buildings or swimming pools that do not correspond to any existing entries in the land registry data, new entries may be created in process 718. Process 720 may be further used to determine tax non-conformity and to correspondingly update the land registry data. For example, swimming pools may not have been reported after they are built. For another example, building additions may be built without obtaining proper permits. Process 720 may further facilitate classifying land properties into different luxury levels for tax purposes. Such classification may be automatically performed according to size and recognized features in landmarks in updated from the aerial images based on the systems and models as described above.

FIGS. 2-7 are described in the particular context of recognizing and segmenting landmarks in aerial images. However, the principles described therein with respect to distributed training in multiple levels, dividing the input images into blocks with overlaps, deduplication of recognized objects in the overlapping regions, aggregation landmarks that are difficult for computer model to differentiate in training data, and multi-stage and self-validating training of CNN models, are applicable to other object recognition and segmentation applications.

Figure 8:
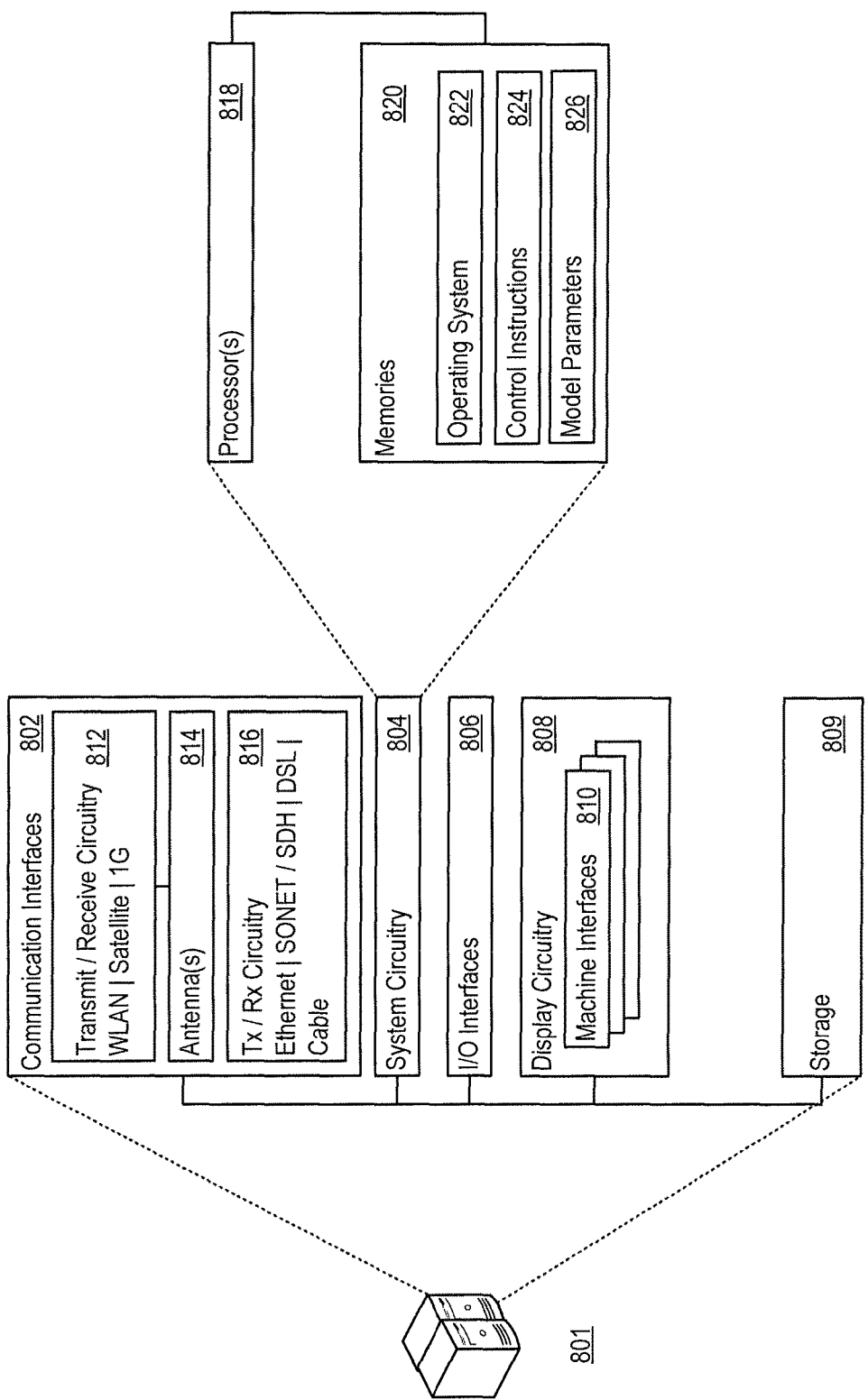
FIG. 8 illustrates an exemplary computing component that may be used for implementing the process flows and data pipelines for object or landmark recognition and segmentation of FIGS. 1 and 2.

FIG. 8 shows one embodiment where the object recognition and segmentation system 100 of FIG. 1 and the landmark recognition and segmentation system 200 of FIG. 2 are implemented by computing resources such as computers 801. The system 100 and 200 may be implemented by multiple such computers. These computers may be dedicated physical machines or may be virtual machines. They may be located in one geographic locations or may be geographically distributed.

Each computer 801 may include communication interfaces 802, system circuitry 804, input/output (I/O) interfaces 806, storage 809, and display circuitry 808 that generates machine interfaces 810 locally or for remote display. The machine interfaces 810 and the I/O interfaces 806 may include GUIs, touch sensitive displays, voice or facial recognition inputs, buttons, switches, speakers and other user interface elements. Additional examples of the I/O interfaces 806 include microphones, video and still image cameras, headset and microphone input/output jacks, Universal Serial Bus (USB) connectors, memory card slots, and other types of inputs. The I/O interfaces 106 may further include magnetic or optical media interfaces (e.g., a CDROM or DVD drive), serial and parallel bus interfaces, and keyboard and mouse interfaces.

The communication interfaces 802 may include wireless transmitters and receivers ("transceivers") 812 and any antennas 814 used by the transmitting and receiving circuitry of the transceivers 812. The transceivers 812 and antennas 814 may support Wi-Fi network communications, for instance, under any version of IEEE 802.11, e.g., 802.11n or 802.11ac. The communication interfaces 802 may also include wireline transceivers 816. The wireline transceivers 816 may provide physical layer interfaces for any of a wide range of communication protocols, such as any type of Ethernet, data over cable service interface specification (DOCSIS), digital subscriber line (DSL), Synchronous Optical Network (SONET), or other protocol.

The storage 809 may be used to store various initial, intermediate, or final data or model for object/landmark recognition, segmentation, and further data analytics. The storage 809 may further store training aerial images, land maps, and land registry data used for training and deployment of the object/landmark recognition and segmentation models, and various data analytics based on the output of the models. The storage 809 may be centralized or distributed. For example, it may be hosted remotely by a cloud computing service provider.

The system circuitry 804 may include hardware, software, firmware, or other circuitry in any combination. The system circuitry 804 may be implemented, for example, with one or more systems on a chip (SoC), application specific integrated circuits (ASIC), microprocessors, discrete analog and digital circuits, and other circuitry. The system circuitry 804 is part of the implementation of any desired functionality related to the training, deployment, and data analytics of the object/landmark recognition and segmentation models and systems. As just one example, the system circuitry 804 may include one or more processors 818, such as instruction processors, and memories 820. The memories 820 may store, for example, control instructions 824 and an operating system 822. The system circuitry 804 may further include specific processors 818 (such as GPUs and other artificial intelligence processors) for implementing the CNN models. The memories 820 may correspondingly store model parameters 826 for the CNN models. The memories 820 may be standalone, or may alternatively be embedded with the processors 818 for fast data access. In one implementation, the processors 818 execute the control instructions 824, the operating system 822, and implement the CNN models to carry out any desired functionality related to recognition, segmentation, and data analytics of the system 100 and 200.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible.

What is claimed is:

1. A system comprising:
a database;
a memory:
   the memory for storing a multilayer landmark recognition and segmentation convolutional neural network, and
   the memory communicatively coupled to the database; and
system circuitry in communication with the database and the memory, and configured to:
   receive an input aerial image and an input land map corresponding to a geographic region, the input aerial image and the input land map received from the database;
   divide:
      the input aerial image into a plurality of partially overlapping aerial blocks, and
      the input land map into a plurality of partially overlapping map blocks corresponding to the aerial blocks;
   input the aerial blocks with overlapping regions into the multilayer landmark recognition and segmentation convolutional neural network to obtain a first set of predicted landmark boundary boxes, wherein:
      the predicted landmark boundary boxes for landmarks in the aerial blocks are associated with corresponding landmark labels,
      each landmark is associated with one of a predetermined set of landmark types, and
      each boundary box is labeled with one of the predetermined set of landmark types;
   identify and remove duplicate boundary boxes within the overlapping regions between the aerial blocks to generate a second set of predicted landmark boundary boxes and corresponding landmark labels;
   apply a first filter to the second set of predicted landmark boundary boxes to:
      remove boundary boxes that are erroneously generated by the multilayer landmark recognition and segmentation convolutional neural network, and
      generate a third set of predicted landmark boundary boxes with corresponding landmark labels;
   apply a second filter to the third set of predicted landmark boundary boxes to generate a fourth set of predicted landmark boundary boxes with corresponding landmark labels by:
      identifying sets of landmark boundary boxes that are adjacent to each other and are associated with a same landmark within each set of landmark boundary boxes, and
      aggregating each set of landmark boundary boxes into a single landmark boundary box; and
   enhance a digital landmark registry associated with the geographic region based on the fourth set of predicted landmark boundary boxes and corresponding landmark labels.

2. The system of claim 1, wherein the landmarks in the geographic region comprise buildings and swimming pools and the predetermined set of landmark types correspondingly comprise a building type and a swimming pool type.

3. The system of claim 2, wherein the first filter is configured to filter the second set of predicted landmark boundary boxes by:
   identifying roads in the aerial blocks based on the map blocks;
   identifying predicted boundary boxes among the second set of predicted landmark boundary boxes that are of the swimming pool type and that overlap with the roads as erroneously predicted boundary boxes by the multilayer landmark recognition and segmentation convolutional neural network; and
   removing the erroneously predicted landmark boundary boxes from the second set of predicted landmark boundary boxes to generate the third set of predicted landmark boundary boxes.

4. The system of claim 3, wherein the first filter or the second filter is configured to filter the second or third set of predicted landmark boundary boxes in a distributed manner wherein the second or third set of predicted landmark boundary boxes are filtered separately and in parallel between aerial blocks.

5. The system of claim 2, wherein the first filter is configured to filter the second set of predicted landmark boundary boxes by:
   identifying predicted landmark boundary boxes among the second set of predicted landmark boundary boxes that are of the swimming pool type and that overlap with buildings identified based on the map blocks as erroneously predicted boundary boxes by the multilayer landmark recognition and segmentation convolutional neural network; and
   removing the erroneously predicted landmark boundary boxes from the second set of predicted landmark boundary boxes to generate the third set of predicted landmark boundary boxes.

6. The system of claim 5, wherein the first filter is configured to determine that a predicted landmark boundary box of the swimming pool type overlaps with a building when a percentage of the predicted landmark boundary box of the swimming pool type lying within a boundary box of the building is higher than a predetermined threshold.

7. The system of claim 2, wherein the second filter is configured to filter the third set of predicted landmark boundary boxes by:
   identifying landmark boundary boxes among the third set of predicted landmark boundary boxes that are of the swimming pool type;
   identifying swimming pool boundary boxes that overlap;
   aggregating the overlapping swimming pool boundary boxes into a single boundary box; and
   replacing the overlapping swimming pool boundary boxes in the third set of predicted landmark boundary boxes with the single boundary box to generate the fourth set of predicted landmark boundary boxes.

8. The system of claim 1, wherein the system circuitry is further configured:
   convert locations of landmark boundary boxes in the fourth set of predicted landmark boundary boxes to geographical coordinates based on the aerial blocks and meta data associated with the aerial blocks;
   determine a subset of boundary boxes among the fourth set of predicted landmark boundary boxes that correspond to entries in the digital landmark registry according to the geographical coordinates; and
   determine tax non-conformity based on boundary box information of the subset of boundary boxes and size information contained in the digital landmark registry.

9. The system of claim 1, wherein the system circuitry, when configured to enhance the digital landmark registry based on the fourth set of predicted landmark boundary boxes, is configured to:
- convert locations of landmark boundary boxes in the fourth set of predicted landmark boundary boxes to geographical coordinates based on the aerial blocks and meta data associated with the aerial blocks;
- determine a subset of landmark boundary boxes among the fourth set of predicted landmark boundary boxes that do not correspond to any entries in the digital landmark registry based on the geographical coordinates; and
- update the digital landmark registry with the subset of landmark boundary boxes.

10. The system of claim 1, wherein the system circuitry is configured to train the multilayer landmark recognition and segmentation convolutional neural network, the training comprising:
- receiving training aerial images and training land maps corresponding to a training geographic region from the database;
- dividing the training aerial images into a plurality of partially overlapping training aerial blocks and divide the training land maps into a plurality of partially overlapping training map blocks corresponding to the training aerial blocks;
- identifying an initial set of landmarks each belonging to one of the predetermined set of landmark types in the training aerial blocks and store corresponding boundary boxes, locations in the training aerial blocks, and landmark types for the initial set of landmarks as an initial set of training labels;
- training an intermediate multilayer convolutional neural network based on the initial set of training labels;
- generating expanded set of training labels using the trained intermediate multilayer convolutional neural network;
- validating the expanded set of training labels; and
- training the multilayer landmark recognition and segmentation convolutional neural network based on the validated expanded set of training labels.

11. The system of claim 1, wherein the system circuitry is configured to train the multilayer landmark recognition and segmentation convolutional neural network by:
- receiving training aerial images and training land maps corresponding to a training geographic region from the database;
- dividing the training aerial images into a plurality of partially overlapping training aerial blocks and divide the training land maps into a plurality of partially overlapping training map blocks corresponding to the training aerial blocks;
- identifying a first set of landmarks each belonging to one of the predetermined set of landmark types in the training aerial blocks and store corresponding boundary boxes, locations in the training aerial blocks, and landmark types for the first set of landmarks as a first set of training labels;
- training an intermediate multilayer convolutional neural network to output a second set of predicted labels containing boundary boxes, locations, and landmark types of landmarks using the training aerial blocks and the first set of training labels as input, wherein the intermediate multilayer convolutional neural network is trained to generate a collective error between the first set of training labels and a subset of the second set of predicted labels corresponding to the first set of training labels that are smaller than a first predetermined threshold;
- obtaining a third set of predicted and validated labels among the second set of predicted labels that are additional to the first set of training labels;
- combining the third set of predicted and validated labels and the first set of training labels to form a fourth set of training labels; and
- training the multilayer landmark recognition and segmentation convolutional neural network to output a fifth set of predicted labels containing boundary boxes, locations, and landmark types of landmarks using the training aerial blocks and the fourth set of training labels as input, wherein the multilayer landmark recognition and segmentation convolutional neural network is trained to generate a collective error between the fourth set of training labels and the fifth set of predicted labels that are smaller than a second predetermined threshold.

12. A method performed by a system circuitry in communication with a database and a memory for storing a multilayer landmark recognition and segmentation convolutional neural network, the method comprising:
- receiving an input aerial image and an input land map corresponding to a geographic region from the database;
- dividing the input aerial image into a plurality of partially overlapping aerial blocks and divide the input land map into a plurality of partially overlapping map blocks corresponding to the aerial blocks;
- inputting the aerial blocks with overlapping regions into the multilayer landmark recognition and segmentation convolutional neural network to obtain a first set of predicted landmark boundary boxes for landmarks in the aerial blocks with corresponding landmark labels, wherein each landmark is of one of a predetermined set of landmark types and each boundary box is labeled with one of the predetermined set of landmark types;
- identifying and removing duplicate boundary boxes within the overlapping regions between the aerial blocks to generate a second set of predicted landmark boundary boxes and corresponding landmark labels;
- applying a first filter to the second set of predicted landmark boundary boxes to remove boundary boxes that are erroneously generated by the multilayer landmark recognition and segmentation convolutional neural network, and to generate a third set of predicted landmark boundary boxes with corresponding landmark labels;
- applying a second filter to the third set of predicted landmark boundary boxes to generate a fourth set of predicted landmark boundary boxes with corresponding landmark labels by identifying sets of landmark boundary boxes that are adjacent to each other and are associated with a same landmark within each set of landmark boundary boxes, and by aggregating each set of landmark boundary boxes into a single landmark boundary box; and
- enhancing a digital landmark registry associated with the geographic region based on the fourth set of predicted landmark boundary boxes and corresponding landmark labels.

13. The method of claim 12, wherein the landmarks in the geographic region comprise buildings and swimming pools and the predetermined set of landmark types correspondingly comprise a building type and a swimming pool type.

14. The method of claim 13, wherein the first filter is configured to filter the second set of predicted landmark boundary boxes by:
   identifying roads in the aerial blocks based on the map blocks;
   identifying predicted boundary boxes among the second set of predicted landmark boundary boxes that are of the swimming pool type and that overlap with the roads as erroneously predicted boundary boxes by the multilayer landmark recognition and segmentation convolutional neural network; and
   removing the erroneously predicted landmark boundary boxes from the second set of predicted landmark boundary boxes to generate the third set of predicted landmark boundary boxes.

15. The method of claim 14, wherein the first filter or the second filter is configured to filter the second or third set of predicted landmark boundary boxes in a distributed manner wherein the second or third set of predicted landmark boundary boxes are filtered separately and in parallel between aerial blocks.

16. The method of claim 13, wherein the first filter is configured to filter the second set of predicted landmark boundary boxes by:
   identifying predicted landmark boundary boxes among the second set of predicted landmark boundary boxes that are of the swimming pool type and that overlap with buildings identified based on the map blocks as erroneously predicted boundary boxes by the multilayer landmark recognition and segmentation convolutional neural network; and
   removing the erroneously predicted landmark boundary boxes from the second set of predicted landmark boundary boxes to generate the third set of predicted landmark boundary boxes.

17. The method of claim 16, wherein the first filter is configured to determine that a predicted landmark boundary box of the swimming pool type overlaps with a building when a percentage of the predicted landmark boundary box of the swimming pool type lying within a boundary box of the building is higher than a predetermined threshold.

18. The method of claim 13, wherein the second filter is configured to filter the third set of predicted landmark boundary boxes by:
   identifying landmark boundary boxes among the third set of predicted landmark boundary boxes that are of the swimming pool type;
   identifying swimming pool boundary boxes that overlap;
   aggregating the overlapping swimming pool boundary boxes into a single boundary box; and
   replacing the overlapping swimming pool boundary boxes in the third set of predicted landmark boundary boxes with the single boundary box to generate the fourth set of predicted landmark boundary boxes.

19. The method of claim 12, wherein enhancing the digital landmark registry based on the fourth set of predicted landmark boundary boxes comprises:
   converting locations of landmark boundary boxes in the fourth set of predicted landmark boundary boxes to geographical coordinates based on the aerial blocks and meta data associated with the aerial blocks;
   determining a subset of landmark boundary boxes among the fourth set of predicted landmark boundary boxes that do not correspond to any entries in the digital landmark registry based on the geographical coordinates; and
   updating the digital landmark registry with the subset of landmark boundary boxes.

20. The method of claim 12, wherein enhancing the digital landmark registry based on the fourth set of predicted landmark boundary boxes comprises:
   converting locations of landmark boundary boxes in the fourth set of predicted landmark boundary boxes to geographical coordinates based on the aerial blocks and meta data associated with the aerial blocks;
   determining a subset of landmark boundary boxes among the fourth set of predicted landmark boundary boxes that do not correspond to any entries in the digital landmark registry based on the geographical coordinates; and
   updating the digital landmark registry with the subset of landmark boundary boxes.

* * * * *